United States Patent
Plona

(10) Patent No.: US 7,510,332 B2
(45) Date of Patent: Mar. 31, 2009

(54) COMPENSATION FOR AN INSUFFICIENT SUPPLY OF LUBRICANT IN AN INTER-SHAFT BEARING

(75) Inventor: Daniel Georges Plona, Vulaines sur Seine (FR)

(73) Assignee: SNECMA, Paris (FR)

( * ) Notice: Subject to any disclaimer, the term of this patent is extended or adjusted under 35 U.S.C. 154(b) by 311 days.

(21) Appl. No.: 11/283,818

(22) Filed: Nov. 22, 2005

(65) Prior Publication Data

US 2006/0115194 A1    Jun. 1, 2006

(30) Foreign Application Priority Data

Nov. 29, 2004    (FR)    ................................ 0452798

(51) Int. Cl.
*F16C 33/66* (2006.01)
*F01D 25/18* (2006.01)

(52) U.S. Cl. ....................... 384/473; 415/111
(58) Field of Classification Search ......... 384/473–475, 384/462–468, 564, 561, 477; 60/39.08; 415/111
See application file for complete search history.

(56) References Cited

U.S. PATENT DOCUMENTS

| | | | |
|---|---|---|---|
| 3,140,129 A * | 7/1964 | Koss | 384/477 |
| 3,161,448 A * | 12/1964 | Moran | 384/462 |
| 3,357,757 A * | 12/1967 | Cooper et al. | 60/39.08 |
| 3,752,543 A | 8/1973 | Schmidt | |
| 4,205,525 A * | 6/1980 | Hamburg et al. | 60/39.08 |
| 4,265,334 A | 5/1981 | Benhase, Jr. | |
| 4,502,274 A | 3/1985 | Girault | |
| 5,433,584 A | 7/1995 | Amin et al. | |
| 5,722,167 A * | 3/1998 | Duchamp et al. | 384/488 |
| 5,749,660 A * | 5/1998 | Dusserre-Telmon et al. | 384/475 |
| 6,261,003 B1* | 7/2001 | Dusserre-Telmon et al. | 384/475 |
| 6,872,003 B2* | 3/2005 | Dusserre-Telmon et al. | 384/99 |
| 7,040,811 B2* | 5/2006 | Dusserre-Telmon et al. | 384/99 |
| 2004/0131296 A1 | 7/2004 | Friedrich et al. | |

FOREIGN PATENT DOCUMENTS

FR    1 385 198    1/1965
GB    2 358 678    8/2001

OTHER PUBLICATIONS

Patent Abstracts of Japan, JP 61-096219, May 14, 1986.

* cited by examiner

*Primary Examiner*—Thomas R Hannon
(74) *Attorney, Agent, or Firm*—Oblon, Spivak, McClelland, Maier & Neustadt, P.C.

(57) ABSTRACT

The quality of the lubrication of an inter-shaft bearing, particularly one with counter-rotational bushes, is improved by the presence of an obstacle on the outer bush which allows an adjustment in the quantity of oil present on the outer roll track. In particular, the drying of the roll track under the effect of the repeated running of the runners is compensated for by organizing a mandatory axial circulation.

21 Claims, 3 Drawing Sheets

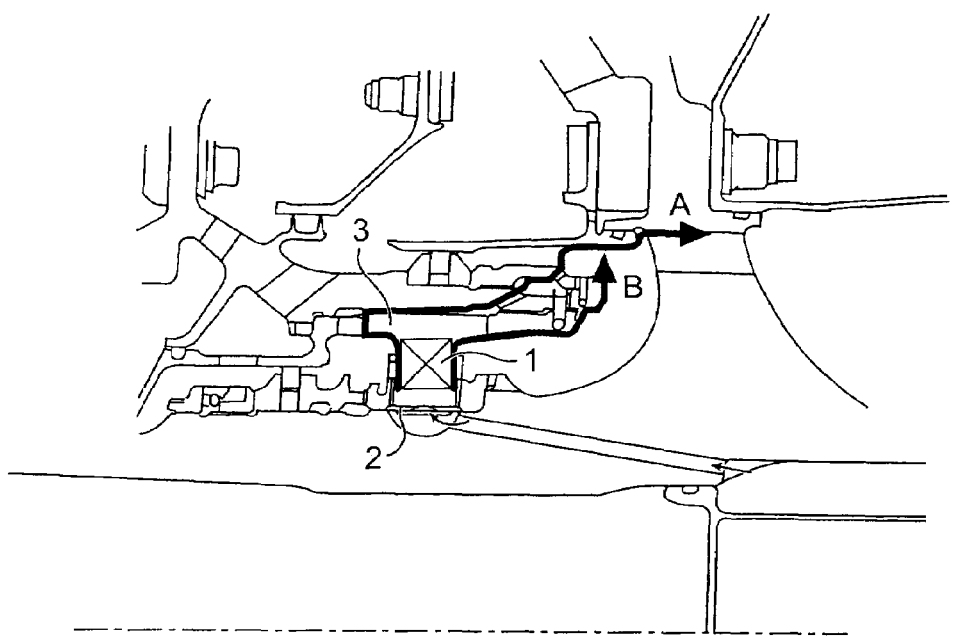
FIG.1
BACKGROUND ART
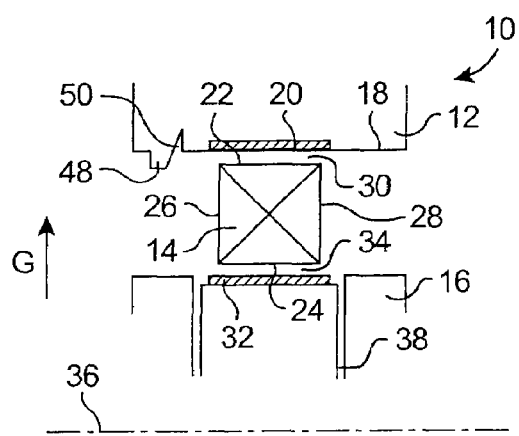 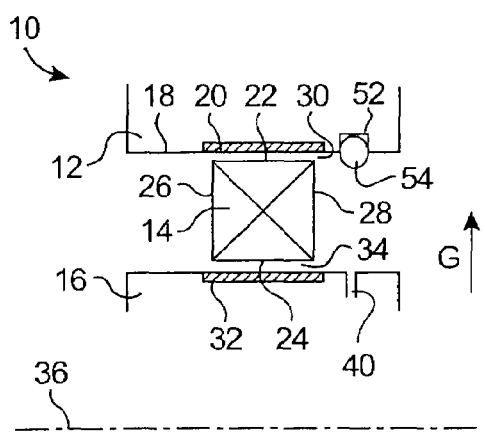
FIG.2a  FIG.2b

COMPENSATION FOR AN INSUFFICIENT SUPPLY OF LUBRICANT IN AN INTER-SHAFT BEARING

TECHNICAL FIELD

The invention relates to rolling bearings, mainly in the aeronautics field.

More particularly, the invention relates to means for improving lubrication on a roll track, particularly in the event of the two bushes of the bearing being in rotation, in other words for an inter-shaft bearing.

BACKGROUND ART

Inter-shaft bearings are located between two rotary shafts: constituted by two bushes interdependent with each of the shafts and with runners, or rollers, placed between them, the inter-shaft bearings allow each of the shafts to rotate independently while minimising friction and vibrations. In particular, in the context of an aeroplane turbine engine, this type of bearing can be found between the high-pressure turbine and the medium pressure turbine, mounted on concentric shafts that rotate in the same direction or in the reverse direction. Lubrication is then provided by an oil of aeronautic quality which circulates in the bearing along preset paths. An example is given in the document GB-A-2 358 678.

To this end, as shown by FIG. 1, a lubricant is injected onto the roller 1 at the level of the inner bush 2. A run path A, B is specified: by means in particular of the centrifugal force, the oil circulates along the roller 1, reaches the inner surface of the outer bush 3, and is drained along the inner surface towards the run paths A, B. In the context of FIG. 1, one part circulates upstream A and one part in the downstream direction B, on each side of the runners 1.

In normal running operations, the rolling bodies 1, 2, 3 are separated by a film of oil the thickness of which depends on the operating conditions of the bearing (such as the contact pressure, the relative speed of the rolling bodies, the piezo-viscosity characteristics of the lubricant) and which allows surface deterioration arising out of the relative movement, from overheating for example, to be reduced. Usually, the input of the contact between outer bush and roller is considered as sufficiently supplied (indeed, the thickness of the surface film is often more than 20 times greater than that of the hydrodynamic film at the contact centre); however, when the thickness of the surface film is substantially reduced, the contact is no longer sufficiently supplied with lubricant and the result of this is a reduction in the height of the hydrodynamic film; then occurs a phenomenon of insufficient supply. Two main root causes can be identified for such an insufficiency of supply:

In high-speed running, and principally where rolling bearings are involved, the frequency with which the rolling bodies run on the roll track means that the surface film does not recover its nominal value between two runs of the rollers. At high-frequency, the result is a substantial reduction in the height of the hydrodynamic film.

If for a stationary bush, the thickness of the surface film is mainly a function of the surface tension characteristics of the fluid, when the outer bush is in rotation, the thickness of the surface film also additionally becomes a function of the centrifugal field, the fluid characteristics and the distance from the point under consideration relative to the drainage orifices (located on either side of the roll track).

Inter-shaft roller runs, particularly when the shafts are counter-rotational, are therefore an area favourable to the appearance of phenomena of insufficient supply, particularly the bearings used in aeronautics in the light of the rotation speeds involved.

Furthermore, a proper dimensioning of a high-speed run consists in providing an oil feedback circuit that is sufficiently permeable for the oil not to be able to accumulate on the track, the consequence of which would be an unacceptable increase in dissipated power.

Compensating for an insufficient supply of lubricant in respect of an inter-shaft bearing is therefore an issue if a jet turbine engine for example is to operate properly.

DISCLOSURE OF THE INVENTION

The invention relates, according to one of its aspects, to a rolling bearing able to overcome the drawbacks arising out of an insufficient supply of lubricant, among other advantages.

In particular, this invention relates to a process allowing the quantity of lubricant to be measured that is available for the oil film to form while retaining optimum drainage in order to control changes in the power dissipated by the run.

More particularly, the invention, according to one of its aspects, relates to a rolling bearing that includes one inner bush, one outer bush and one roller unit, consisting for example of separate runners distributed in a cage, such that, when these three elements are in the operational position, one inside the other, a free rotation of each is possible. The outer bush has on its inner surface an irregularity, located away from the roll track, which may act as an obstacle to a lubricating fluid flowing along this inner surface. Thus, when the bushes and runners are rotated, the lubricating oil cannot flow freely outside the possible contact area, and one part is forced to direct itself axially on the roll track, in the clearance between roller and inner surface of the outer bush, thereby increasing the quantity of oil available to form the lubricating film.

The rolling bearing according to the invention is particularly advantageous for the inter-shaft bearings used in aeronautics, particularly in turbine engines, since the solution proposed is able to operate whatever the temperature, and at the high speeds of relative rotation involved. The invention thus also relates to a shaft or a turbine engine comprising the former.

Preferably, the irregularity consists of a protuberance projecting on the inner surface in proximity to the roller unit, just upstream of the track in the direction of circulation of the lubricant. The protuberance may comprise notches separated by runs for the lubricant, but is preferably composed of a circular projection around the inner surface of the outer bush. Preferably, the protuberance is formed integrally with the bush, for example by forging, and a trough clearance may be adjacent to it to facilitate its manufacture.

It is also possible to have an obstacle on the downstream circulation path of the lubricating fluid.

In this respect furthermore, and for ease of assembly, particularly in the context of an inter-shaft bearing intended for a turbine engine, it may be preferable to create the obstacle in two parts: the inner surface of the outer bush may comprise a groove located in proximity to the rollers, into which is inserted for example an elastomer washer projecting from the inner surface.

According to another aspect, the invention relates to a process for improving the lubrication of a rolling bearing that includes the creation of an obstacle to the flow of the lubricating fluid, so as to force it to direct itself onto the outer roll track, between roller and outer bush.

BRIEF DESCRIPTION OF THE DRAWINGS

Other characteristics and advantages will emerge in the examples below, given of course on an illustrative and non-restrictive basis, with reference to the appended figures.

FIG. 1, already described, shows a conventional circulation diagram for the lubricating oil in an inter-shaft bearing of a turbine engine.

FIGS. 2a and 2b show rolling bearings according to embodiments of the invention.

DETAILED DISCLOSURE OF PARTICULAR EMBODIMENTS

Figure 3A:
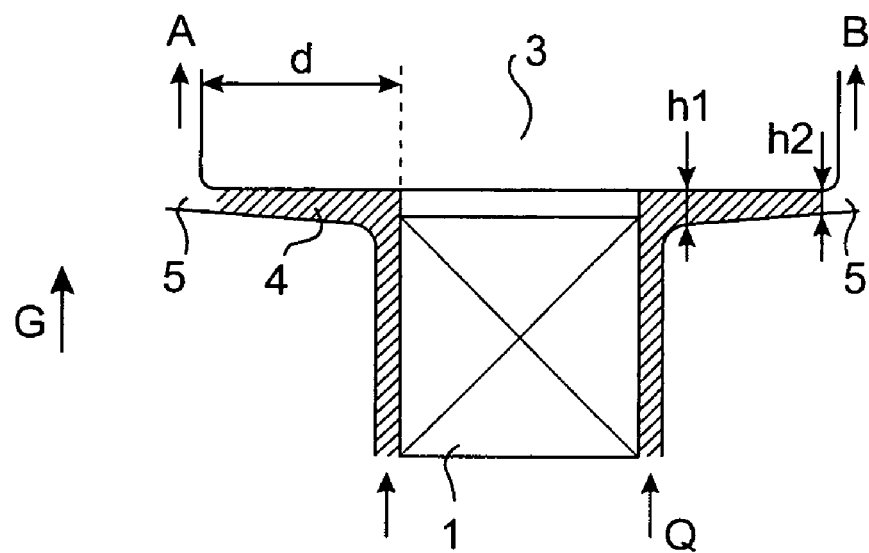
FIGS. 3a and 3b show the principle of the flow of the lubricant with and without obstacle.

As shown diagrammatically in FIG. 2, a rolling bearing with cylindrical rollers 10 conventionally includes an outer bush 12, a roller unit 14 and an inner bush 16.

The outer bush 12 is generally tubular in shape. Its inner surface 18 defines a substantially cylindrical cavity in which are located the rollers 14 and the inner bush 16. The inner surface 18 has a first roll track 20 at which the whole unit 14 rotates when the bearing 10 is in operation. The first roll track 20 is dimensioned so as to take into account the axial displacement of the rollers 14 when the bearing 10 is in operation.

Generally speaking, the rollers 14 are in the form of runners, of substantially rectangular cross-section in a plane containing the axis of rotation. The unit 14 constituted by the runners has an outer surface 22 which is complementary with the first roll track 20, or outer track, although normally less wide, an inner surface 24 which is opposite to it and two sides 26, 28, upstream and downstream from a possible circulation of lubricant. The diameter of the unit 14 of the runners on its outer surface 22 is generally slightly less than the diameter of the roll track 20, defining a clearance 30; the thickness of the clearance 30 is however sufficiently small to avoid vibrations and ensure the operation of the rolling bearing 10.

The inner surface 24 of the roller unit 14 is found opposite a second roll track 32 located on the outer surface of the inner bush 16, which is generally cylindrical in shape. In the same way, there is a clearance 34 between the second roll track 32 and the runners 14.

The bearing 10 allows a relative rotation between two parts anchored to the outer 12 and inner 16 bushes: for example, the inner bush 16 is anchored to a shaft rotating around the axis 36, and the rollers 14 act as an interface to decouple from it the second part anchored to the outer bush 12. In the case of an inter-shaft bearing, the two bushes 12, 16 are coupled to coaxial rotary shafts, and the unit 14 allows the two shafts, in other words the two bushes 12, 16, to rotate around the axis 36 independently, in the same direction or not, while reducing vibration and friction. In an aeroplane turbine engine particularly, the two shafts coupled to the bushes 12 and 16 are counter-rotational; in particular, the frequency with which a roller 14 runs over a point in the first roll track 20 can reach 5000 to 9000 Hz.

When the bearing 10 is in operation, given the rotation of each of its constituent elements, a centrifugal force G is created, which tends to move each element away from the axis 36, and the clearance 30 between outer surface 22 of the rollers 14 and first roll track 20 is much acted upon.

In order to avoid a deterioration in the outer surface 22 of each roller 14 and the inner surface 18 of the bush 12, and to reduce overheating due to the speed of rotation, a lubricant is used. Given the operating temperatures and speeds in a turbine engine, lubricating oil is recommended, the characteristics of which are known in the aeronautical field.

Inlets are therefore provided to bring the lubricating oil along the rollers 14 and onto the inner surface 18 of the outer bush 12, particularly onto the roll track 20 in the clearance 30. Given the centrifugal force G and the radial displacement of the lubricant far from the axis 36, it is desirable for the lubricant inlets to be located at the inner bush 16, or directly in the space between the two bushes 12, 16. Oil run paths to ensure the flow of the lubricant are provided in the outer bush 12, or more often in the part which is fastened to it; they may take different forms, but principally relate to an upstream A and/or downstream B flow.

There are different geometries for the inlets, as shown by way of examples in FIGS. 2a and 2b. In FIG. 2a, apertures 38 are located in the second roll track 32, on each side of the rollers 14. In this way, the oil is able to circulate along each side 26, 28 of the runners 14 and to lead for example to the two run paths A, B shown in FIG. 1. In FIG. 2b, an aperture 40 is located on the outer surface of the bush 16. The oil in this case preferably circulates on a downstream side 28 of the roller 14. It is of course conceivable to have two apertures 40 on the outer surface, or only one aperture 38 in the roll track, or any other combination of the solutions.

To simplify, it may be said that provision is made for the lubricant flow, when the oil reaches the inner surface 18 of the outer bush 12, to separate in two before entering the run path, one part directing itself axially into the clearance 30 on the roll track 20. As shown in diagrammatic form in FIG. 1, given the speed of rotation in particular, it appears that, rapidly, the flow follows only run path A or B; if a residual film of oil of minimum thickness (less than 20 µm) remains on the rollers 14 due to surface tensions, given the repeated running of the runners 14, the roll track 20 ends up drying out and there is a lack of lubrication.

In fact, to counter this insufficient supply, it is impossible to take away the main run path and force the entire flow to direct itself into the clearance 30: a jam is created and the dissipated power, directly related to the quantity of lubricant on the surface, becomes incompatible with a normal operation of the bearing 20.

According to the invention, it is proposed to organise a mandatory axial circulation of the flow of lubricant through the clearance 30: thus, the quantity of oil present on the roll track 20 is adjusted, and the consequences of an insufficient supply to the contact are avoided.

To organise this mandatory axial circulation, an obstacle to the normal flow of the oil is created. It may be located upstream of the flow, or downstream, possibly on each side, depending on the preset flow paths A, B and the conditions of manufacture and use. In each of the cases, it is a question of creating a projection 42 on the inner surface 18 of the outer bush 12 on which the oil is circulating, its flow then being partially blocked by the projection and therefore flowing back towards the space located between the bush and the runner. In particular, this solution additionally makes it possible to use the centrifugal force G generated by the rotation of the outer bush 12 in order to increase its efficiency.

Figure 3B:
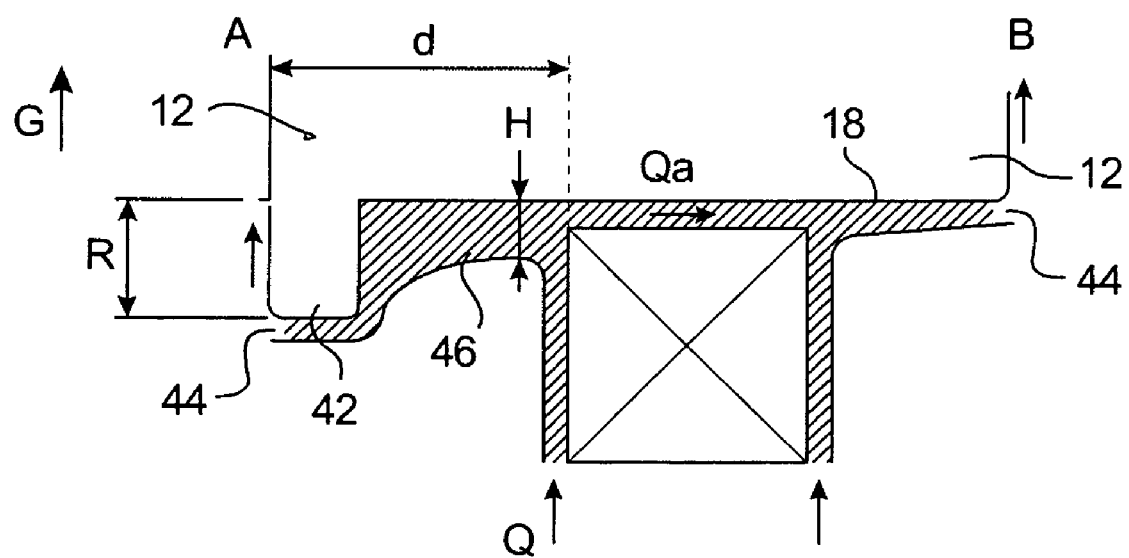

An illustration of the principle is given in FIGS. 3a and 3b. FIG. 3a shows the different lubrication parameters in a conventional run including a runner 1 along which a lubricant 4 flows with a flow rate Q; in the interests of convenience, the two paths A and B are shown symmetrical relative to the runner 1. In relation to the outer bush 3, the lubricant is forced laterally towards drainage points 5 separated from the runner 1 by a distance d. It may be noted that the thickness of the lubricant film 4 on the outer bush 3 diminishes by h1 at the roller 1 down to h2 at the drainage point 5. The thickness h2 is directly related to the flow rate Q of injected lubricant, to the centrifugal force G created (in other words to the speed of relative rotation between roller 1 and bush 3), to the lubricant parameters (density $\rho_1$ and viscosity $v_1$), and to the distance d: h1≧h2=f (Q, G, $\rho_1$, $v_1$, d).

FIG. 3b shows a case according to the invention where a projection 42 is located between one of the drainage points 44 and the runner 14, which are separated by a distance d. In this case, the oil film 46 on the outer bush 12 reaches a thickness of the order of the height R of the projection 42 at its level. The height R is selected to be much greater than h1; therefore the height H of the oil film at the runner 14 when the projection 42 is present is greater than the height h1 usually obtained: H=f (R, Q, G, $\rho_1$, $v_1$, d). An axial flow rate Qa may thus be created between roller 14 and roll surface 18, the value of the flow rate Qa also being determined by the height H, the flow rate Q and the force G.

The height R of the projection may be determined as a function of the distance d and the height H of the reinforced lubricant film 46 which it is required to obtain for a flow rate Qa, in other words the quantity of lubricant necessary to achieve effective lubrication: the thickness of lubricant in the clearance (its flow rate Qa) has a direct effect on the power dissipated. The height H is thus preset by calculations, and validated experimentally so as not to overly disturb the operation of the bearing through cranking. At certain speeds in particular, a flow rate in the main circuits A, B is maintained, for example if the total thickness of lubricant generates excessive agitation of the oil during light loading operations. The obstacle 42 typically measures, in respect of aeronautical inter-shaft bearings, about 1/10 mm up to 1 mm.

One of the possibilities for creating the obstacle 42 is to provide a protuberance 48 as shown in FIG. 2a on the inner surface 18 of the outer bush 12. To advantage, the protuberance 48 is located at a distance from the roll track 20 less than the width of the rollers 14, preferably about half the width of a runner 14; the width of a runner 14 is taken over its outer surface 22 in the direction of the run axis 36.

By roll track must be understood the track where the rollers 14 are able to manoeuvre during a normal operation: a roll track 20, 32 is thereby wider than the corresponding surface of the runner 14 so as to take account of its axial displacement caused by the speeds and forces in play, and the distance specified above between the protuberance 48 and the roll track is less than the distance d previously specified. Thus for example, for a runner 14 of outer surface 22 between 8 and 14 mm wide, the axial displacement may reach 6 mm, and the roll track 20 has therefore a width greater than 15 mm. The protuberance 48 is located away from the roll track 20, with a safety margin of about 3 to 4 mm approximately, normally less than the width of the runner 14, preferably less than 4 to 7 mm, in other words half its width.

The protuberance 48 may be constituted by notches separating runs for the lubricant. To advantage however, the protuberance 48 is identical all around the bush, in other words it is presented in the form of a regular projection. Although it is possible to add an ancillary element onto the inner surface 18, it is preferable for the protuberance 48 to be formed all in one piece with the outer bush 12. One of the possibilities is forging, turning or grinding. To facilitate the manufacture of the projection 48, it is possible to have a trough clearance 50 arising out of the manufacturing process, located to advantage between the protuberance 48 and the first roll track 20, as shown in FIG. 2a.

Figure 4A:
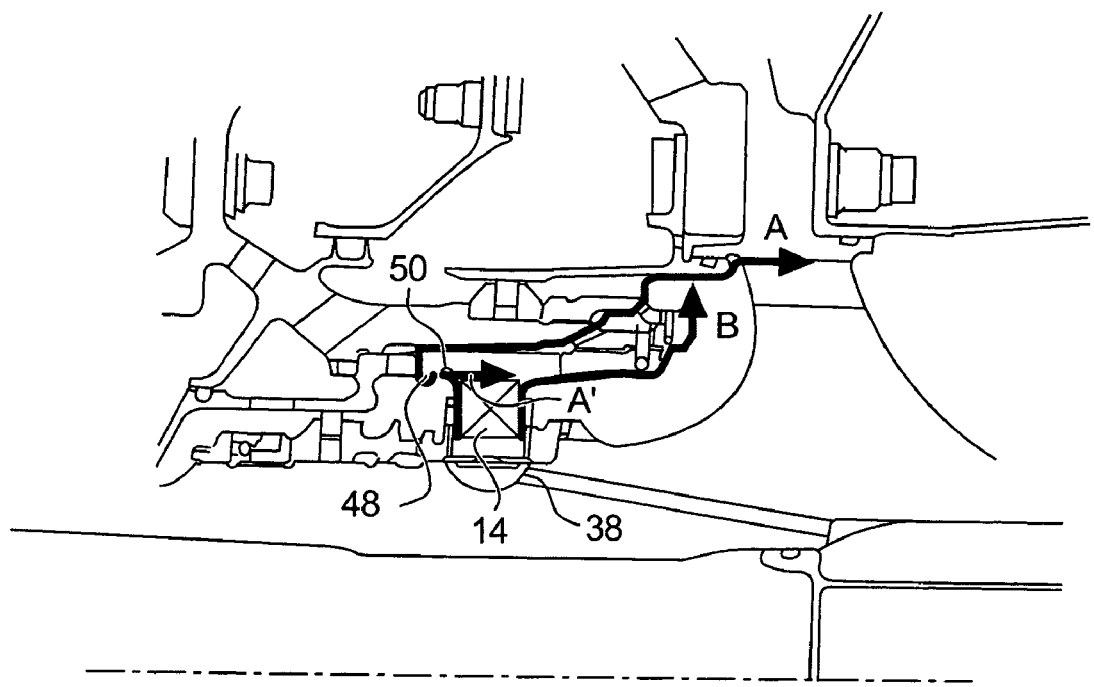
FIGS. 4a and 4b show circulation diagrams for the lubricating oil with an inter-shaft bearing according to the invention replacing the bearing in FIG. 1.

To advantage, such a protuberance 48 is located upstream of the roller 14. In this case, and as shown in FIG. 4a, the lubricant intended for the upstream path A comes up against the protuberance 48. One part then flows back and follows the downstream path A' located in the clearance 30, while the rest continues in the path A. As specified previously, the relative quantity of lubricant between the two paths A, A' depends on the height of the projection 48, and on the speed of rotation, just as on the nature of the oil (temperature, viscosity, etc).

Figure 4B:
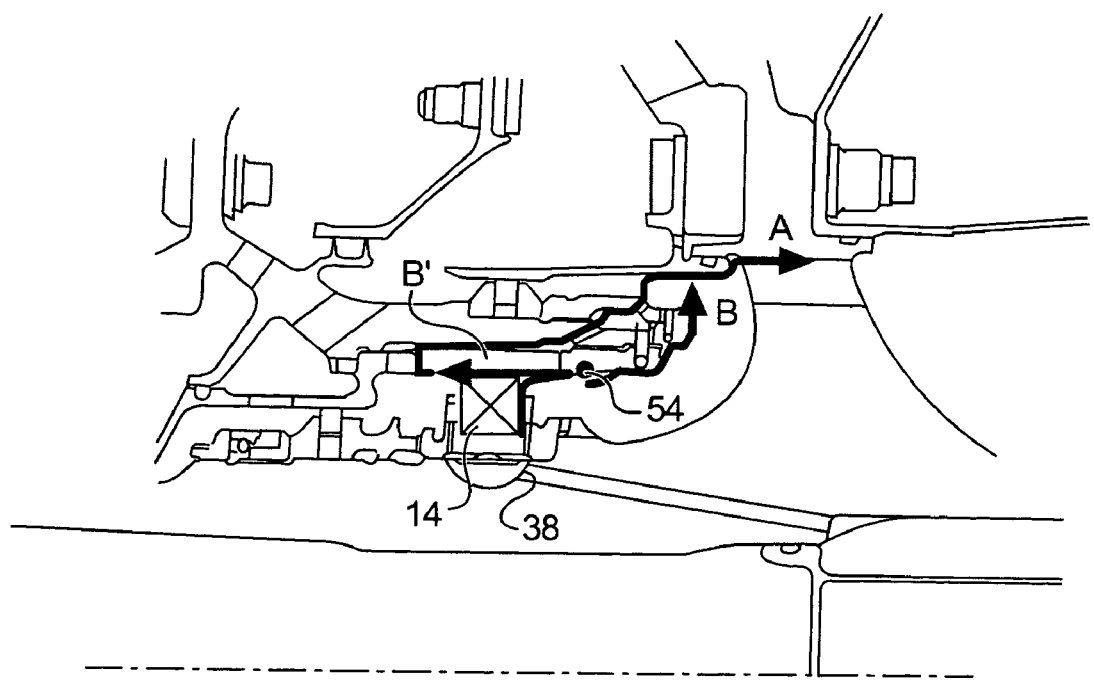

The protuberance 48 may also be located on the downstream path B. in this case, and in the same way, the lubricant flowing downstream is driven back by the protuberance in order to direct itself axially and in an upstream direction into the clearance 30 (FIG. 4b). In FIG. 4b the absence of lubricant on the upstream side 26 of the roller 14 may be noted: this depends on the arrangement of the lubricant inlets 38, 40, and has no effect on the operation of the invention; a combination of the two solutions is conceivable.

As shown in FIG. 4b, the obstacle may have a different shape from the one described in FIG. 2a. In fact, in the particular context of an aircraft, engine, the inter-shaft bearing is mounted by inserting the runners 14 into the outer bush 12 from downstream (considering the direction of the run path). The presence of a projection may then make the bearing 10 difficult to install. One solution is to have a projection in two parts, as shown in FIG. 2b. A slot 52 is thus created in the inner surface 18 of the bush 12; to advantage, this slot 52 is a circular groove, of rectangular cross-section for example, extending all around the inner surface 18. Into the groove is inserted, after or prior to assembly, a projecting element 54. To advantage, the projecting element may be an elastomer washer 54: such a flexible obstacle allows the runners 14 to be inserted when assembling the rotors of an engine for example.

The different embodiments, as already specified, are given only by way of indication, and any alternative and/or combination can be conceived: the invention relates in fact to a process for improving the lubrication of an inter-shaft bearing by creating an obstacle to the normal flow and thus regulating the flow of the lubricant fluid on the outer bush. The different possibilities for creating the obstacle fall within the framework of the invention.

What is claimed is:

1. A rolling bearing including:
   an outer bush having an inner surface delimiting a generally cylindrical cavity and including a first roll track;
   an inner bush having a generally cylindrical outer surface including a second roll track;
   a roller unit placed between the first and second roll tracks and having an outer surface of a shape complementary to the first roll track;
   wherein each of the rollers, outer bush and inner bush is mounted to rotate freely around its axis of rotation;
   wherein the outer bush includes a protuberance located on its inner surface laterally relative to the first roll track and the protuberance is configured to guide an axial circulation of flow of lubricant through a clearance between the outer surface of the roller unit and a diameter of the first roll track.

2. The rolling bearing according to claim 1 wherein the protuberance is located at a distance from the first roll track lower than or equal to half the width of the outer surface of the rollers.

3. The rolling bearing according to claim 2 wherein the protuberance is formed unitarily with the outer bush.

4. The rolling bearing according to claim 3 additionally including a trough clearance adjacent to the protuberance on the side of the first roll track.

5. The rolling bearing according to claim 3 wherein the inner bush includes at least one lubricant fluid inlet.

6. The rolling bearing according to claim 2 wherein the protuberance is in the form of a continuous projection along the periphery of a cavity over the inner surface.

7. The rolling bearing according to claim 6 wherein the protuberance comprises an elastic washer located in a continuous groove along the periphery of a cavity on inner surface.

8. The rolling bearing according to claim 7 wherein the inner bush includes at least one lubricant fluid inlet.

9. The rolling bearing according to claim 1 including a slot located on the inner surface of the outer bush at a distance from the first roll track less than or equal to half the width of the outer surface of the rollers.

10. The rolling bearing according to claim 9 wherein the slot is in the form of a continuous groove along the periphery of the cavity on inner surface.

11. The rolling bearing according to claim 10 additionally including an elastic washer configured to be located in the groove and to be held therein.

12. A turbine engine comprising a rolling bearing according to claim 1.

13. The rolling bearing according to claim 1 wherein the inner bush includes at least one lubricant fluid inlet.

14. The roller bearing according to claim 13, wherein the at least one fluid inlet is disposed, in an axial direction, closer to the protuberance than is a portion of the roller unit farthest from the protuberance.

15. The roller bearing according claim 14, wherein a fluid channel extends along the inner surface of the outer bush and away from the roller unit in an axial direction on a side of the roller unit opposite a side on which the protuberance is disposed, and the fluid channel includes a first portion with a first thickness, as measured in a radial direction, and a second portion disposed farther from the protuberance, as measured in the axial direction, than the first portion, the second portion having a second thickness in the radial direction smaller than the first thickness.

16. A shaft assembly of an engine comprising:
   a rolling bearing including an outer bush and an inner bush, one of the bushes being fastened to a shaft, and a roller unit configured to rotate freely between the two bushes, wherein the outer bush comprises a projecting part located on its inner surface and offset laterally relative to the roller unit,
   wherein the inner bush includes at least one lubricant fluid inlet, and the projecting part is configured to guide lubricant fluid from the fluid inlet in an axial direction through a clearance between an outer surface of the roller unit and the outer bush.

17. The shaft assembly according to claim 16 wherein the projecting part is a projection of the outer bush.

18. The shaft assembly according to claim 16 wherein the projection is continuous around the inner surface.

19. The shaft assembly according to claim 16 wherein the projecting part is formed by a washer located in a groove disposed in the inner surface of the outer bush.

20. A turbine engine comprising the shaft assembly according to claim 16.

21. The shaft according to claim 16, wherein the outer surface of the roller unit facing the clearance is substantially parallel to the axial direction in which the lubricant fluid flows.

* * * * *